United States Patent
Zhao (10) Patent No.: US 10,573,082 B2
(45) Date of Patent: Feb. 25, 2020

(54) TARGET OBJECT DISPLAY METHOD, DEVICE AND SYSTEM

(71) Applicant: Tencent Technology (Shenzhen) Company Limited, Shenzhen (CN)

(72) Inventor: Yi Zhao, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 16/112,493

(22) Filed: Aug. 24, 2018

(65) Prior Publication Data
US 2018/0365903 A1    Dec. 20, 2018

Related U.S. Application Data

(63) Continuation-in-part of application No. PCT/CN2017/077221, filed on Mar. 20, 2017.

(30) Foreign Application Priority Data

Mar. 29, 2016    (CN) .......................... 2016 1 0188583

(51) Int. Cl.
| | |
|---|---|
| G06T 19/00 | (2011.01) |
| H04W 4/80 | (2018.01) |
| G06T 19/20 | (2011.01) |

(52) U.S. Cl.
CPC .......... G06T 19/006 (2013.01); G06T 19/003 (2013.01); G06T 19/20 (2013.01); H04W 4/80 (2018.02)

(58) Field of Classification Search
None
See application file for complete search history.

(56) References Cited

U.S. PATENT DOCUMENTS

2009/0158210 A1 * 6/2009 Cheng .................... G06Q 10/10
715/810
2009/0243969 A1    10/2009 Matsubara et al.
(Continued)

FOREIGN PATENT DOCUMENTS

| CN | 102339023 A | 2/2012 |
|---|---|---|
| CN | 103412892 A | 11/2013 |

(Continued)

OTHER PUBLICATIONS

Tencent Technology, ISRWO, PCT/CN2017/077221, dated May 31, 2017, 9 pgs.
(Continued)

*Primary Examiner* — Ryan M Gray
(74) *Attorney, Agent, or Firm* — Morgan, Lewis & Bockius LLP (57) ABSTRACT

This application discloses a target object display method applied to a computing device. The computing device receives an identifier information combination from a communications device. The identifier information combination is generated by the communications device after identifying identifiers in radio frequency tags of at least two entities and combining the identified identifiers. After parsing the identifier information combination to obtain the at least two identifiers in the identifier information combination, the computing device obtains target objects having the identifiers and then invokes an application associated with the obtained target objects. Finally, the computing device displays, using the application, the obtained target objects in a combined manner on a display screen according to a pre-stored location relationship between target objects, the target objects having the identifiers being virtual images corresponding to entities having the identifier in a radio frequency identifier.

17 Claims, 7 Drawing Sheets

(56) References Cited

U.S. PATENT DOCUMENTS

| | | | | |
|---|---|---|---|---|
| 2010/0056285 | A1* | 3/2010 | Weston | A63G 31/00 472/136 |
| 2015/0117647 | A1* | 4/2015 | Haseltine | H04L 9/0827 380/270 |
| 2015/0306496 | A1* | 10/2015 | Haseltine | H04L 65/403 463/31 |
| 2016/0067604 | A1* | 3/2016 | Yim | A63F 3/00643 463/31 |
| 2017/0168556 | A1* | 6/2017 | Goslin | G06F 3/16 |
| 2017/0173451 | A1* | 6/2017 | Pedersen | A63H 27/12 |
| 2017/0225069 | A1* | 8/2017 | Goslin | A63F 13/428 |
| 2017/0232335 | A1* | 8/2017 | Williams | A63F 13/235 463/31 |
| 2018/0071615 | A1* | 3/2018 | Maharbiz | A63F 3/00214 |

FOREIGN PATENT DOCUMENTS

| | | |
|---|---|---|
| CN | 104463055 A | 3/2015 |
| CN | 105260409 A | 1/2016 |
| CN | 204990352 U | 1/2016 |
| CN | 105354736 A | 2/2016 |
| CN | 105825253 A | 8/2016 |

OTHER PUBLICATIONS

Tencent Technology, IPRP, PCT/CN2017/077221, dated Oct. 2, 2018, 8 pgs.

\* cited by examiner

FIG. 1

| | |
|---|---|
| Receive an identifier information combination, the identifier information combination being generated by the communications device after identifying identifiers in radio frequency tags of at least two entities and combining the identified identifiers, and any two of the at least two entities not belonging to a same entity | 201 |
| Parse the identifier information combination to obtain the at least two identifiers included in the identifier information combination | 202 |
| Obtain target objects having the identifiers, invoke an application associated with the obtained target objects, and display, using the application, the obtained target objects in a combined manner on a display screen according to a pre-stored location relationship between target objects, the target objects having the identifiers being virtual images corresponding to entities having the identifier in a radio frequency identifier | 203 |

306a — A computing device determines the location relationship between the obtained target objects according to a correspondence between a target object combination and a location relationship between target objects included in the target object combination 306b — Display the obtained target objects in a combined manner on the display screen according to the location relationship

TARGET OBJECT DISPLAY METHOD, DEVICE AND SYSTEM

PRIORITY CLAIM AND RELATED APPLICATION

This application is a continuation-in-part application of PCT/CN2017/077221, entitled "TARGET OBJECT DISPLAY METHOD, DEVICE AND SYSTEM" filed on Mar. 20, 2017, which claims priority to Chinese Patent Application No. 201610188583.4, filed with the State Intellectual Property Office of the People's Republic of China on Mar. 29, 2016, and entitled "TARGET OBJECT DISPLAY METHOD, APPARATUS, AND SYSTEM", all of which are incorporated herein by reference in their entirety.

This application is related to U.S. application Ser. No. 16/112,486, entitled "TARGET OBJECT PRESENTATION METHOD AND APPARATUS" filed on Aug. 24, 2018, which is incorporated herein by reference in its entirety.

FIELD OF THE TECHNOLOGY

This application relates to the field of computer technologies, and in particular, to a target object display method, apparatus, and system.

BACKGROUND OF THE DISCLOSURE

As network technologies are developed, target objects such as a virtual character in a game, a personnel model in a personnel management system, and a traffic and road condition model in the traffic field need to be displayed in many scenarios.

When there are many target objects in the background, and a user wants to view a target object provided by an application program, the user needs to open a corresponding interface of the application program according to an opening manner of the application program, and enter a parameter related to the target object on the corresponding interface. The application program obtains the corresponding target object by matching according to the parameter and displays the corresponding target object. Therefore, when the user views the target object in the application program, the user needs to perform complex operations, resulting in low display efficiency.

SUMMARY

To resolve the problem in the related art that when a user views a target object in an application program, the user needs to perform complex operations, resulting in low display efficiency, embodiments of this application provide a target object display method, apparatus, and system. The technical solutions are as follows:

According to a first aspect, a target object display method is provided, applied to a computing device comprising one or more processors and memory storing a plurality of programs to be executed by the one or more processors, the method comprising:

receiving an identifier information combination from a communications device, the identifier information combination being generated by the communications device after identifying identifiers in radio frequency tags of at least two entities and combining the identified identifiers;

parsing the identifier information combination to obtain the at least two identifiers comprised in the identifier information combination;

obtaining target objects having the identifiers and invoking an application associated with the obtained target objects; and displaying, using the application, the obtained target objects in a combined manner on a display screen according to a pre-stored location relationship between target objects, the target objects having the identifiers being virtual images corresponding to entities having the identifier in a radio frequency identifier.

According to a second aspect, a computing device includes a display screen, one or more processors, memory, and a plurality of programs stored in the memory that, when executed by the one or more processors, cause the electronic device to perform the aforementioned target object display method.

According to a third aspect, a non-transitory computer readable storage medium stores a plurality of programs that, when executed by an electronic device having a display screen, cause the electronic device to perform the aforementioned target object display method.

Technical solutions provided in the embodiments of this application are as follows. The identifier information combination is received, the identifier information combination being generated by the communications device after identifying identifiers in radio frequency tags of at least two entities and combining the identified identifiers; the identifier information combination is parsed to obtain the at least two identifiers included in the identifier information combination; and the target objects having the identifiers are obtained, and the obtained target object are displayed in a combined manner on the display screen according to the pre-stored location relationship between target objects. The entity only needs to be placed in a sensing range of the communications device. The computing device may obtain the virtual target objects having the identifiers in the identifier information combination according to the identifiers in the identifier information combination sent by the communications device, and display the obtained target objects in a combined manner on the display screen according to the location relationship between target objects. Therefore, this improves display efficiency, and resolves the technical problem in the related art that when a user views a target object in an application program, the user needs to perform complex operations, resulting in low display efficiency.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

For concise and intuitive description, the following describes the solutions of this application by using several representative embodiments. However, not all implementations are described in this specification. Many details in the embodiments are only used to help understand the solutions of this application, and the technical solutions of this application may not be limited by the details during implementation. To avoid unnecessarily obscure the solutions of this application, some implementations are not described in detail, and only frameworks are provided. In the following, "including" indicates "including but is not limited to", and "according to . . . " indicates "at least according to . . . , but is not limited to only according to . . . ". "Including" in the specification and claims indicate "at least including to some extent", and shall be construed as that other characteristics may also exist in addition to the mentioned characteristics.

Figure 1:
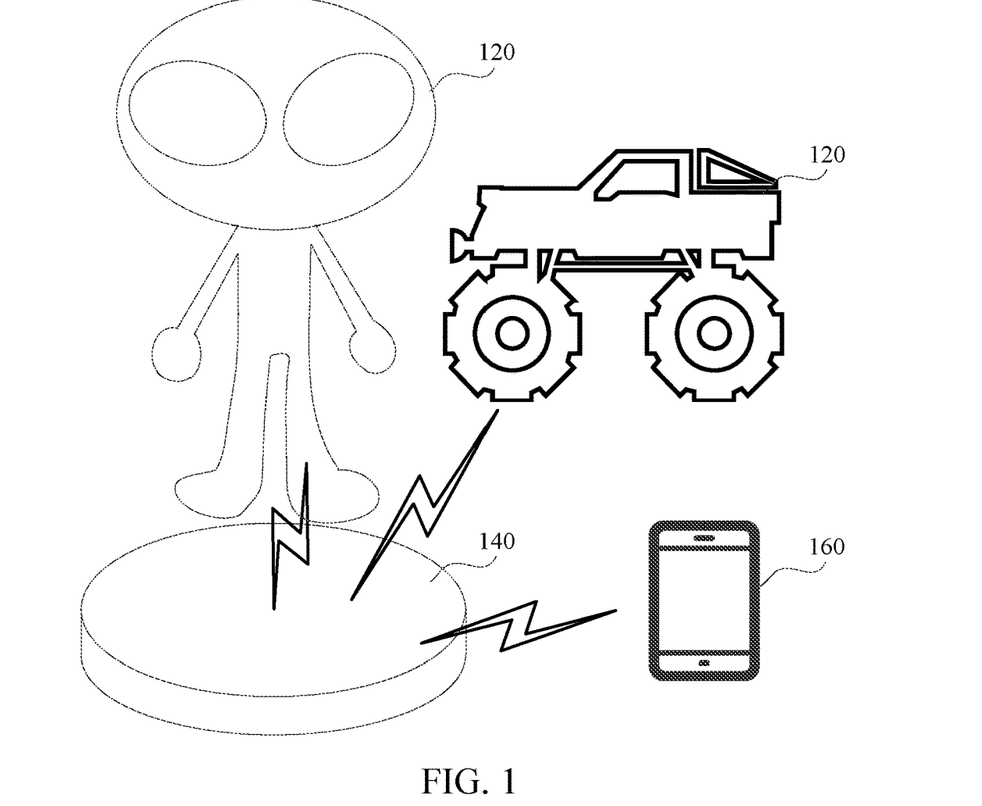
FIG. 1 is a schematic diagram of an implementation environment in a target object display method according to some exemplary embodiments of this application.

FIG. 1 is a schematic diagram of an implementation environment in a target object display method according to some exemplary embodiments of this application. As shown in FIG. 1, the implementation environment may include at least two entities 120, a communications device 140, and a computing device 160.

Each entity 120 includes a radio frequency tag and an electronic chip. Each radio frequency tag includes identifier information of an entity. The electronic chip includes an antenna for receiving and sending a signal. The antenna of the electronic chip broadcasts radio frequency tag data by using a radio frequency field.

A communications device 140 has a near field communication (NFC) module, a wireless communications module (such as a Bluetooth module or a wireless fidelity (WiFi) module), and a microcontroller unit (MCU).

A computing device 160 may be a computing device having an interaction function, such as a desktop computer, a tablet computer, a smartphone, a multimedia playing device, a smart television, or a netbook. In this embodiment of this application, the computing device may also be referred to as a terminal.

The communications device 140 senses, by using an NFC sensor of the NFC module, a radio frequency field provided by the radio frequency tag. When the NFC sensor of the communications device 140 detects a radio frequency field, radio frequency tag data in the radio frequency field is read. Moreover, the communications device 140 may further establish a connection to the computing device 160 in a wireless network manner such as Bluetooth or WiFi.

The implementation environment in the embodiments of this application includes multiple entities 120. The entities 120 may combine to form a system. Each entity 120 is an independent individual, and no entity belongs to a part of another entity. Any combination of entities cannot splice to form an independent and complete entity.

Figure 2:
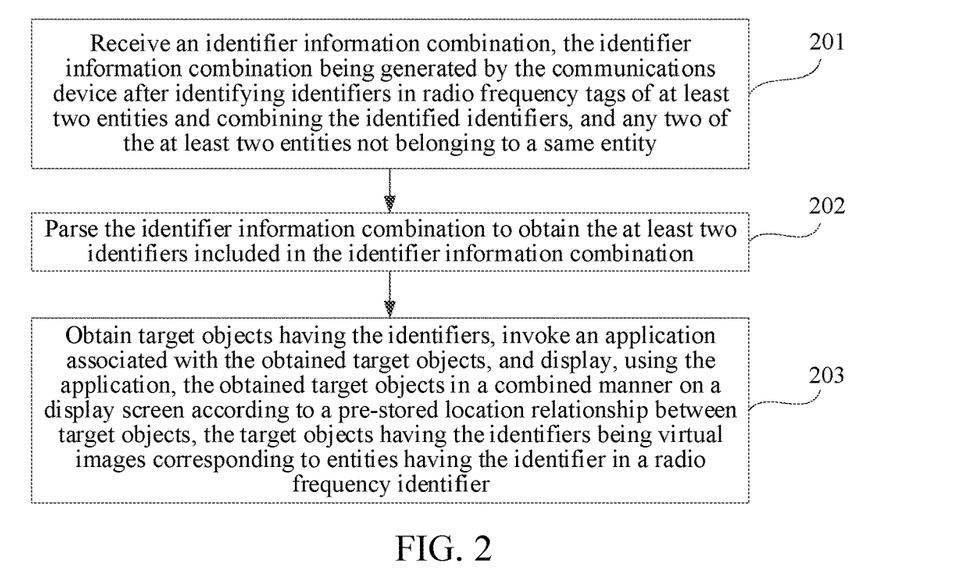
FIG. 2 is a flowchart of a target object display method according to an embodiment of this application.

Referring to FIG. 2, FIG. 2 is a method flowchart of a target object display method according to an embodiment of this application. An example in which the target object display method is applied to the computing device 160 shown in FIG. 1 is used for description. As shown in FIG. 2, the target object display method may include the following steps:

Step 201: Receive an identifier information combination from a communications device 140. In some embodiments, the identifier information combination is generated by the communications device after identifying identifiers in radio frequency tags of at least two entities and combining the identified identifiers. In some embodiments, any two of the at least two entities do not belong to a same entity. As shown in FIG. 1, there is a first wireless communication connection between the computing device and the communications device and a respective second wireless communication connection between the communications device and each of the at least two entities.

The entity herein is an independent individual, and each entity may be a detachable individual or a non-detachable individual. A corresponding location relationship between entities may be stored, but generally entities cannot be spliced. That is, each entity is not a part of another entity, and any two entities are not components of another entity.

Each entity includes a radio frequency tag and an electronic chip. The communications device broadcasts a signal within a preset range. When the electronic chip included in the entity receives the broadcasted signal, the entity broadcasts radio frequency tag data within the preset range. That is, the entity provides a radio frequency field. When the communications device is located in the radio frequency field provided by the entity, the entity and the communications device successfully establish a radio frequency connection. The communications device in the radio frequency field of the entity may obtain radio frequency tag data by using an NFC sensor, and at this moment, the entity has established a radio frequency connection to the communications device.

When the communications device obtains radio frequency tag data, the communications device reads identifier information included in the radio frequency tag. Generally, the identifier information includes an identifier of an entity corresponding to the radio frequency tag.

When the communications device obtains information of at least two identifiers, that is, obtains the at least two identifiers, the MCU combines the obtained identifiers in a preset manner to obtain an identifier information combination. In this embodiment, an identifier combination manner is not specifically limited, and may be set according to an actual case.

Generally, one radio frequency tag is set in one entity. Although the entity is forcibly divided into incomplete individuals, as long as the radio frequency tag and the electronic chip still exist, the communications device can identify a corresponding identifier in the radio frequency tag of the entity.

Step 202: Parse the identifier information combination to obtain the at least two identifiers included in the identifier information combination.

Step 203: Obtain target objects having the identifiers, invoke an application associated with the obtained target objects, and display the obtained target objects in a combined manner on a display screen according to a pre-stored location relationship between target objects, the target objects having the identifiers being virtual images corresponding to entities having the identifier in a radio frequency identifier. In some embodiments, the application is a computer game and each obtained target object is a virtual character of the computer game.

In conclusion, in the target object display method provided in this embodiment, the identifier information combination is received, the identifier information combination being generated by the communications device after identifying identifiers in radio frequency tags of at least two entities and combining the identified identifiers; the identifier information combination is parsed to obtain the at least two identifiers included in the identifier information combination; and the target objects having the identifiers are obtained, and the obtained target object are displayed in a combined manner on the display screen according to the pre-stored location relationship between target objects. The entity only needs to be placed in a sensing range of the communications device. The computing device may obtain the virtual target objects having the identifiers in the identifier information combination according to the identifiers in the identifier information combination sent by the communications device, and display the obtained target objects in a combined manner on the display screen according to the location relationship between target objects. Therefore, this achieves the technical effect of improving display efficiency, and resolves the technical problem in the related art that when a user views a target object in an application program, the user needs to perform complex operations, resulting in low display efficiency.

Figure 3A:
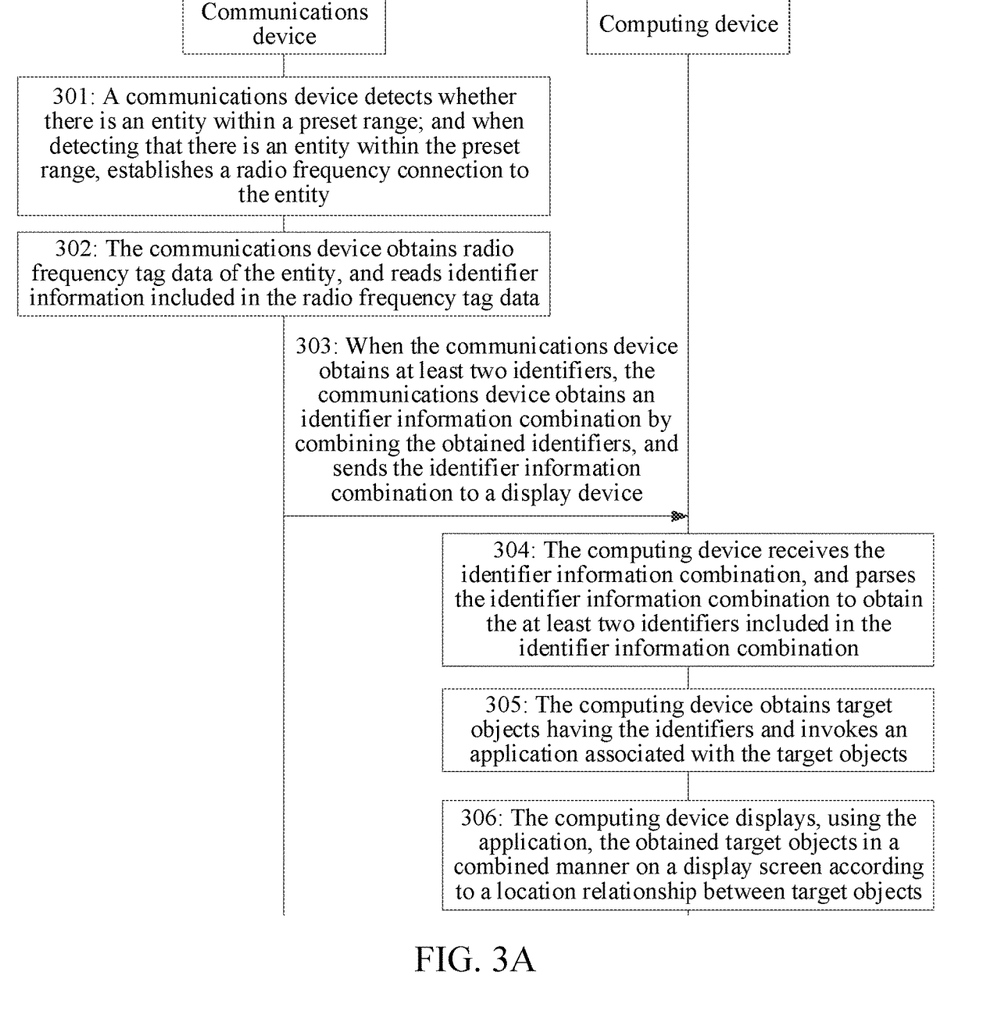
FIG. 3A is a flowchart of a target object display method according to another embodiment of this application.

Referring to FIG. 3A, FIG. 3A is a method flowchart of a target object display method according to another embodiment of this application. An example in which the target object display method is applied to the implementation environment shown in FIG. 1 is used for description. As shown in FIG. 3A, the target object display method may include the following steps:

Step 301: A communications device detects whether there is an entity within a preset range; and when detecting that there is an entity within the preset range, establishes a radio frequency connection to the entity.

The entity herein is an independent individual, and each entity includes a radio frequency tag and an electronic chip. The communications device broadcasts a signal within a preset range. When the electronic chip included in the entity receives the broadcasted signal, the entity broadcasts radio frequency tag data within the preset range. That is, the entity provides a radio frequency field. When the communications device is located in the radio frequency field provided by the entity, the entity and the communications device successfully establish a radio frequency connection. The communications device in the radio frequency field of the entity may obtain radio frequency tag data by using an NFC sensor, and at this moment, the entity has established a radio frequency connection to the communications device.

Step 302: The communications device obtains radio frequency tag data of the entity, and reads identifier information included in the radio frequency tag data.

When the communications device obtains radio frequency tag data, the communications device reads identifier information included in the radio frequency tag. Generally, the identifier information includes at least an identifier of an entity corresponding to the radio frequency tag.

Figure 3B:
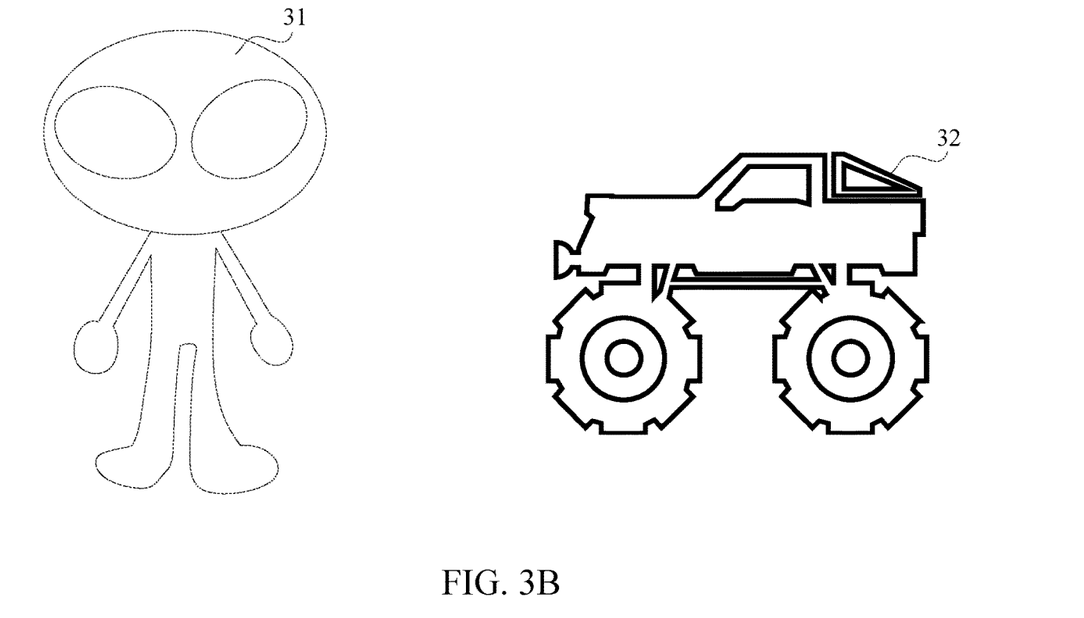
FIG. 3B is a schematic diagram showing that a target object is a hero image entity and a target object is a war chariot model entity according to an embodiment of this application.

For example, when a user wants to play a game on the computing device, the user needs to select a hero and a war chariot to play the game, that is, needs to display a hero and a war chariot on the computing device. As shown in FIG. 3B, FIG. 3B is a schematic diagram showing that a target object is a hero image entity and a target object is a war chariot model entity according to an embodiment of this application. An entity 31 is an entity of a hero and a corresponding identifier of the entity 31 is hero 1. An entity 32 is an entity of a war chariot and a corresponding identifier of the entity 32 is tank 1. The user needs to place the entity 31 and the entity 32 at a location that can be sensed by an NFC sensor. Therefore, the communications device can obtain two radio frequency tags, and read the identifiers of hero 1 and tank 1 from the two video tags.

Figure 3C:
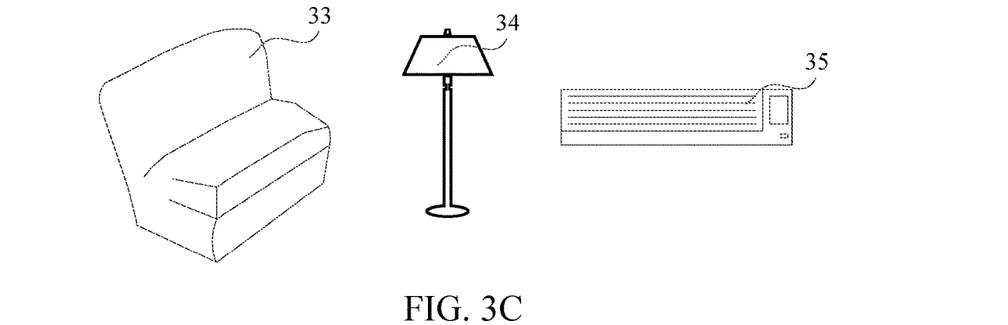
FIG. 3C is a schematic diagram showing that a target object is an entity of a sofa model, a target object is an entity of an air conditioner model, and a target object is an entity of a desk lamp model according to an embodiment of this application.

For another example, in the design field, an interior designer needs to display a schematic diagram of an indoor environment on the computing device, and the schematic diagram needs to include a sofa, a desk lamp, and an air conditioner. As shown in FIG. 3C, FIG. 3C is a schematic diagram showing that a target object is an entity of a sofa model, a target object is an entity of an air conditioner model, and a target object is an entity of a desk lamp model according to an embodiment of this application. An entity 33 is an entity of a sofa, and a corresponding identifier of the entity 33 is sofa 1, entity 34 is an entity of a desk lamp and a corresponding identifier of the entity 34 is lamp 1, and an entity 35 is an entity of an air conditioner, and a corresponding identifier of the entity 35 is air conditioner 1. The user places the entity 33, the entity 34, and the entity 35 at a location that can be sensed by an NFC sensor. Therefore, the communications device can obtain three radio frequency tags, and read the identifiers of sofa 1, lamp 1, and air conditioner 1 from the three video tags.

To obtain the identifier information of the at least two entities, after the communications device simultaneously establishes a radio frequency connection to the at least two entities, perform step 303. Alternatively, the communications device separately establishes a radio frequency connection to the at least two entities within preset duration, and sequentially reads, by using the established radio frequency connection, radio frequency tag data included in a corresponding entity, and perform step 303.

Step 303: When the communications device obtains at least two identifiers, the communications device obtains an identifier information combination by combining the obtained identifiers, and sends the identifier information combination to a computing device.

When the communications device obtains the at least two identifiers, an MCU in the communications device combines the obtained identifiers in a preset manner to obtain the identifier information combination. In this embodiment, an identifier combination manner is not specifically limited, and may be set according to an actual case.

Generally, the MCU may directly combine the identifiers by splicing the identifiers head-to-tail, to obtain the identifier information combination, or combine the identifiers by spacing the identifiers by using a preset character, to obtain the identifier information combination. In this embodiment, the preset character is not limited and may be set according to an actual case.

For example, as shown in FIG. 3B, the preset character may be set to "+". The communications device learns that the identifier of the entity 31 is hero 1 and the identifier of the entity 32 is tank 1, and may combine the identifiers to obtain the identifier information combination hero 1+tank 1.

When the MCU combines the obtained identifiers to obtain the identifier information combination, the MCU further needs to encapsulate the identity information combination layer by layer, and send data of the encapsulated identity information combination to the computing device by using a Bluetooth transmission function of the communications device.

Before step 303 is performed, the communications device and the computing device have established a connection by using Bluetooth, WiFi, or the like.

Step 304: The computing device receives the identifier information combination, and parses the identifier information combination to obtain the at least two identifiers included in the identifier information combination.

Herein, the identifier information combination is parsed in a manner in correspondence with the manner of combining the identifiers in step 303. For example, as shown in FIG. 3B, in step 303, the communications device combines the obtained identifier of hero 1 of the entity 31 and the obtained identifier of tank 1 of the entity 32, to obtain the identifier information combination hero 1+tank 1. In this case, in step 304, the computing device receives the identifier information combination hero 1+tank 1, and parses the identifier information combination to obtain the identifier of hero 1 and the identifier of tank 1.

Step 305: The computing device obtains target objects having the identifiers.

The computing device obtains the target objects having the identifiers according to a correspondence between an identifier and a target object. As shown in FIG. 3B, for example, when the identifier of the entity 31 is hero 1, and the identifier of the entity 32 is tank 1, a target object of a hero image having the identifier of hero 1 and a target object of a war chariot image having the identifier of tank 1 are obtained.

For another example, as shown in FIG. 3C, when the identifier of the entity 33 is sofa 1, the identifier of the entity 34 is lamp 1, and the identifier of the entity 35 is air conditioner 1, a target object of a sofa model having the identifier of sofa 1, a target object of a desk lamp model having the identifier of lamp 1, and a target object of an air conditioner model having the identifier of air conditioner 1 are obtained.

Optionally, the computing device includes target objects that have a same identifier but that are of different types. For example, for target objects of hero images corresponding to the identifier of hero 1, the computing device includes multiple hero images that have the same identifier of hero 1 but that are of different types. The radio frequency tag data is obtained in a display process. An identifier may correspond to the upper bodies of little bears of different types, and a quantity of times. For example, the types may be divided into a cartoon version, a simulated version, and the like. That is, the computing device includes a hero image of a cartoon version and a hero image of a simulated version that have the same identifier of hero 1. The types are not specifically limited herein and may be determined according to a specific implementation.

Figure 3D:
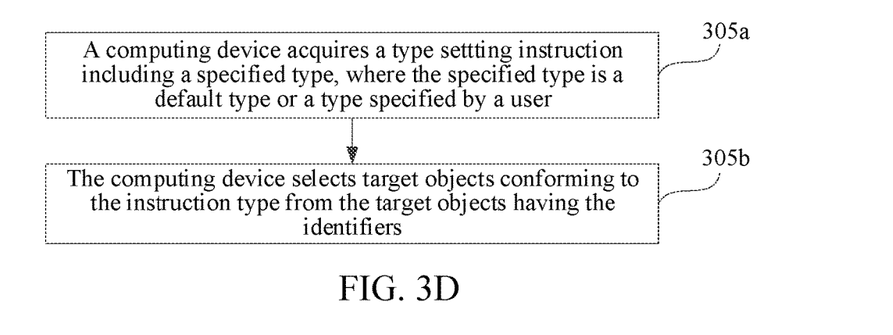
FIG. 3D is a method flowchart of selecting one type of target object from different types of target objects having same identity information according to an embodiment of this application.

To enable a user to select a type of target object from different types of target objects having a same identifier on the computing device, step 305 may be further implemented by using several sub-steps shown in FIG. 3D.

Step 305*a*: The computing device obtains a type setting instruction including a specified type, where the specified type is a default type or a type specified by a user.

The computing device includes target objects that have a same identifier but that are of different types. In this case, the computing device obtains the type setting instruction of the specified type, so that in a subsequent process, a target object conforming to the specified display type can be selected and displayed. The default type described herein may be the default type set in a system.

The type described herein may include a cartoon type, a science fiction type, a simulated type, a male type, a female type, a children type, and the like, and is not limited herein.

Step 305*b*: The computing device selects target objects conforming to the instruction type from the target objects having the identifiers.

For example, the computing device includes multiple target objects that have the identifier of hero 1 but that are of different types, that is, hero images of different types. Hero images having the same identifier of hero 1 may have multiple types such as a cartoon version and a simulated version. When a user sets that only a target object of the cartoon type is displayed, the computing device displays only a hero image of the cartoon type.

Step 306: The computing device displays the obtained target objects in a combined manner on a display screen according to a location relationship between target objects.

The computing device stores a location relationship between objects. For example, a target object of a hero image corresponding to hero 1 is located above a target object of a war chariot model corresponding to tank 1. For another example, a target object of a desk lamp model corresponding to lamp 1 is located on a side of a target object of a sofa model corresponding to sofa 1.

Figure 3E:
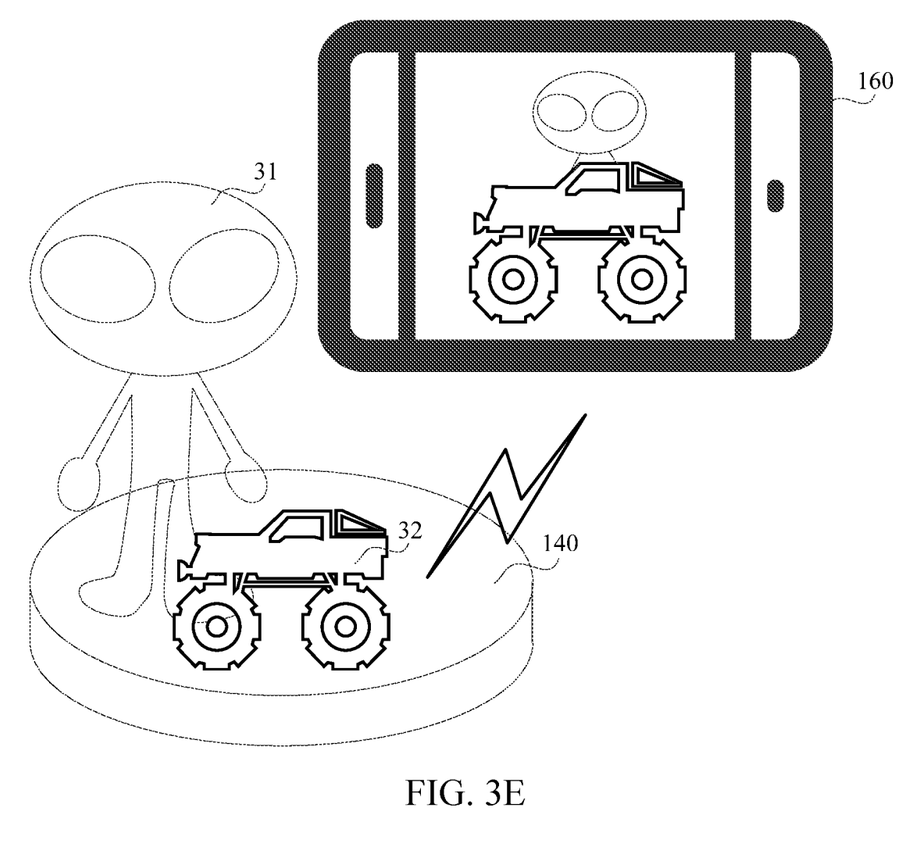
FIG. 3E is a schematic diagram of displaying a hero image and a war chariot model as target objects according to an embodiment of this application.

The computing device displays the obtained target objects in a combined manner on the display screen of the computing device according to a location relationship between target objects. As shown in FIG. 3E, FIG. 3E is a schematic diagram of displaying a hero image and a war chariot model as target objects according to an embodiment of this application. The user places an entity of a hero 31 and an entity of a war chariot 32 at a location that can be sensed by an NFC sensor (that is, the communications device 140). The identifiers obtained by the computing device 160 are hero 1 and tank 1. The location relationship between a target object of a hero image and a target object of a war chariot model that is stored in the computing device 160 is that the target object of a hero image corresponding to hero 1 is located above the target object of a war chariot model corresponding to tank 1. The computing device displays the hero image and the war chariot model in a combined manner according to the location relationship between the target object of the hero image and the target object of the war chariot model.

Figure 3F:
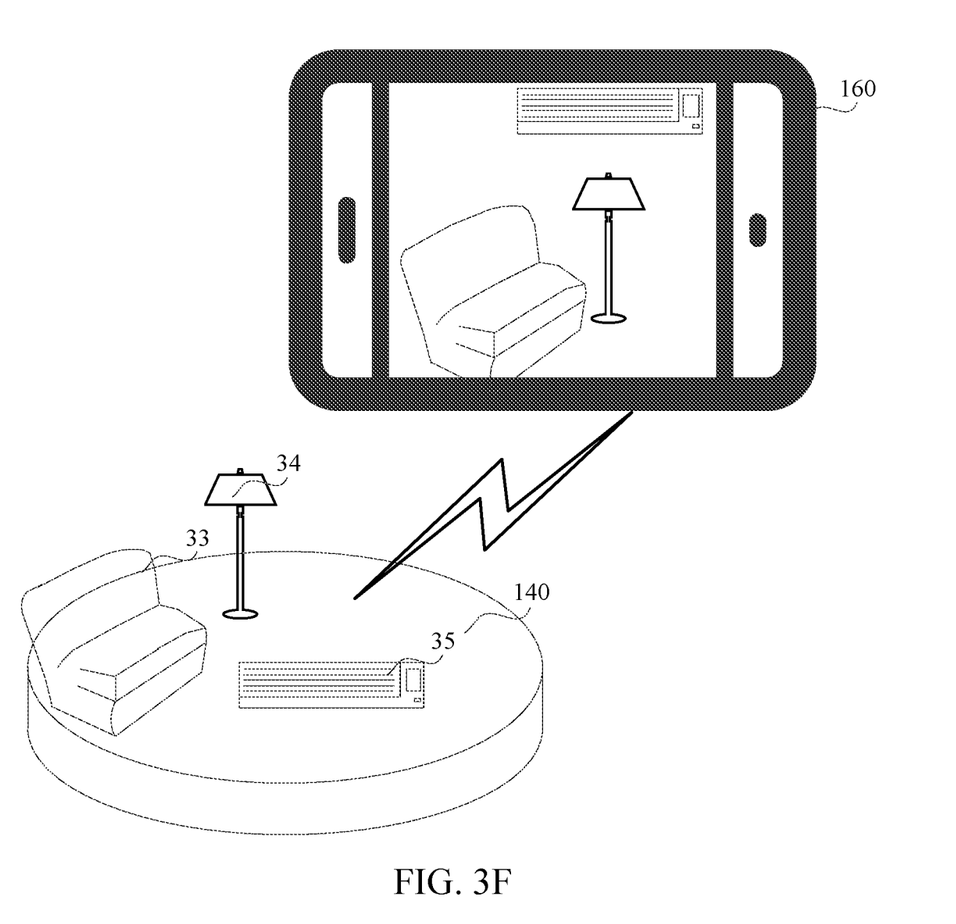
FIG. 3F is a schematic diagram of displaying a sofa model, a desk lamp model, and an air conditioner model as target objects according to an embodiment of this application.

For another example, as shown in FIG. 3E, FIG. 3F is a schematic diagram of displaying a sofa model, a desk lamp model, and an air conditioner model as target objects according to an embodiment of this application. When a user needs to display an indoor environment model on the computing device 160, the user places an entity corresponding to a display model included in an indoor environment at a location that can be sensed by an NFC sensor (that is, the communications device 140). In this case, the computing device 160 can quickly obtain an indoor environment model according to the received identifiers and the location relationship between the target objects corresponding to the identifiers. In this way, the user only needs to place an entity corresponding to a target object that needs to be displayed on the computing device at the location that can be sensed by the NFC sensor, to quickly obtain an indoor environment model.

When a user places an entity of a sofa 33, an entity of a desk lamp 34, and an entity of an air conditioner 35 at the location that can be sensed by the NFC sensor (that is, the communications device 140), the identifiers obtained by the computing device 160 are sofa 1, air conditioner 1, and lamp 1. The location relationship stored in the computing device 160 is that the target object of the desk lamp model corresponding to lamp 1 is located on a side of the target object of the sofa model corresponding to sofa 1, and the target object of the air conditioner model corresponding to air conditioner 1 is located above the target object of the desk lamp model corresponding to lamp 1. The computing device 160 displays the obtained target objects on the display screen according to the location relationship combination.

It should be noted that, the entity described herein is an independent individual. When multiple target objects need to be displayed in a combined manner, the user places a corresponding entity at the location that can be sensed by the NFC sensor, and the entities do not need to be connected. After the computing device obtains the identifiers of the entities, the computing device may display the obtained target objects as a display combination on the display screen according to the pre-stored location relationship between target objects.

Figure 3H:
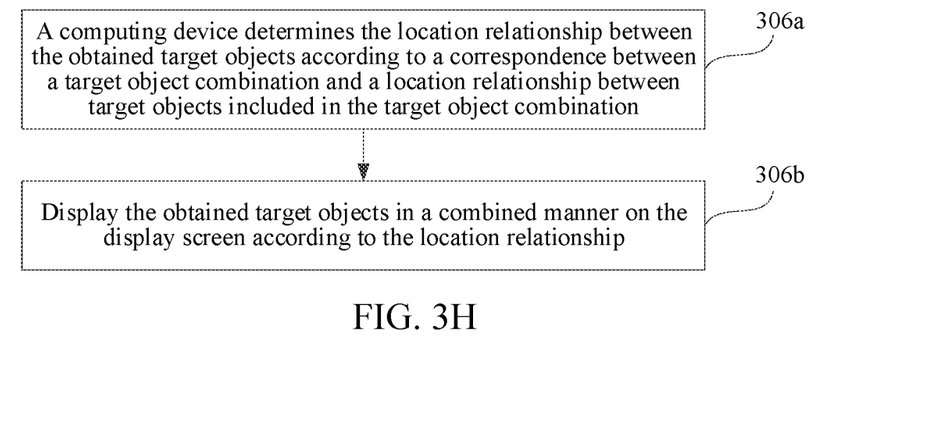
FIG. 3H is a method flowchart of displaying obtained target objects in a combined manner on a display screen according to a location relationship between target objects according to an embodiment of this application.

Specifically, the method flowchart of displaying the obtained target objects in a combined manner on the display screen according to the location relationship between target objects may be implemented by using several sub-steps shown in FIG. 3H.

Step 306*a*: The computing device determines the location relationship between the obtained target objects according to a correspondence between a target object combination and a location relationship between target objects included in the target object combination.

The correspondence described herein is a correspondence between a group of target objects and locations of the group of target objects. For example, the group of target objects include a sofa model having the identifier of sofa 1 and a desk lamp model having the identifier of lamp 1, and the location relationship corresponding to the group of target objects is that the target object of the desk lamp model corresponding to lamp 1 is located on a side of the target object of the sofa model corresponding to sofa 1. When the computing device receives the identifiers sofa 1 and lamp 1, the computing device determines that the location relationship between the sofa model having the identifier of sofa 1 and the desk lamp model having the identifier of lamp 1 is that the target object of the desk lamp model corresponding to lamp 1 is located on a side of the target object of the sofa model corresponding to sofa 1.

Step 306*b*: Display the obtained target objects in a combined manner on the display screen according to the location relationship.

In conclusion, in the target object display method provided in this embodiment, the identifier information combination is received, the identifier information combination being generated by the communications device after identifying identifiers in radio frequency tags of at least two entities and combining the identified identifiers; the identifier information combination is parsed to obtain the at least two identifiers included in the identifier information combination; and the target objects having the identifiers are obtained, and the obtained target object are displayed in a combined manner on the display screen according to the pre-stored location relationship between target objects. The entity only needs to be placed in a sensing range of the communications device. The computing device may obtain the virtual target objects having the identifiers in the identifier information combination according to the identifiers in the identifier information combination sent by the communications device, and display the obtained target objects in a combined manner on the display screen according to the location relationship between target objects. Therefore, this achieves the technical effect of improving display efficiency, and resolves the technical problem in the related art that when a user views a target object in an application program, the user needs to perform complex operations, resulting in low display efficiency.

Moreover, the computing device selects a target object conforming to the instruction type from the target objects having the identifiers by using the obtained type setting instruction. Therefore, during target object display, a target object of a display type specified by the user or a default display type may be displayed. In this way, a target object is not limited to one type, and display forms of the target objects are diversified.

Figure 3I:
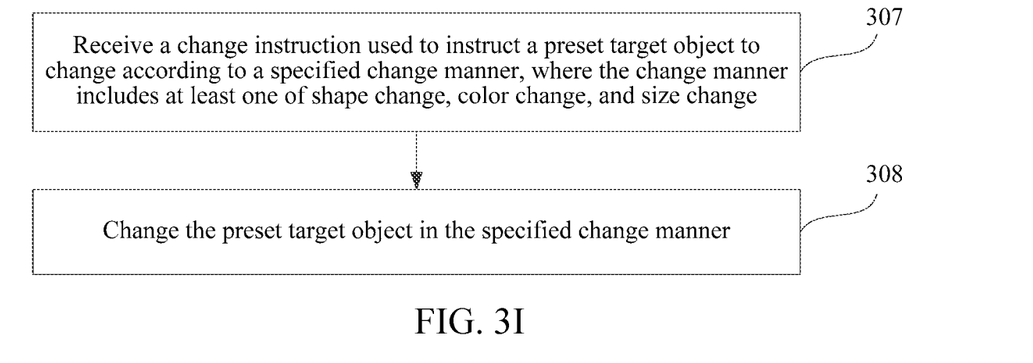
FIG. 3I is a flowchart showing that a user may edit a target object displayed on a computing device according to an embodiment of this application.

Optionally, the user may edit the target object displayed on the computing device, which may be specifically implemented by using several sub-steps shown in FIG. 3I.

Step 307: Receive a change instruction used to instruct a preset target object to change according to a specified change manner, where the change manner includes at least one of shape change, color change, and size change.

The user may edit, according to requirements, the target object displayed on the computing device, for example, change a color, a shape, a size, and the like of the target object. Correspondingly, the computing device receives a change instruction, and changes a preset target object according to a manner specified by the change instruction.

Step 308: Change the preset target object in the specified change manner.

The computing device may further change the preset target object according to the change manner specified by the change instruction. In this way, the user may edit the target object on the computing device according to requirements, and change a display effect of the target object, so that a display form of the target object is not limited to a form of entity.

Figure 4A:
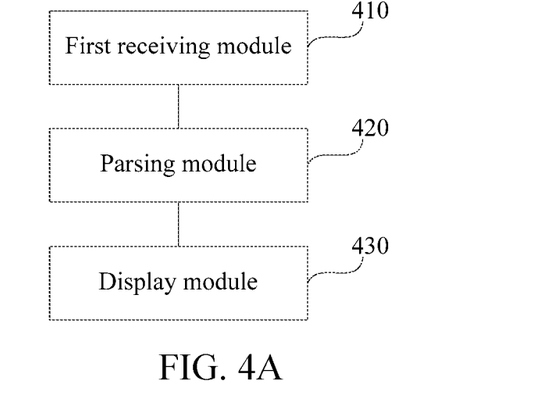
FIG. 4A is a schematic structural diagram of a target object display apparatus according to an embodiment of this application.

Referring to FIG. 4A, FIG. 4A is a block diagram of a target object display apparatus according to an embodiment of this application. The target object display apparatus may include: a first receiving module 410, a parsing module 420, and a display module 430.

The first receiving module 410 is configured to receive an identifier information combination, the identifier information combination being generated by the communications device after identifying identifiers in radio frequency tags of at least two entities and combining the identified identifiers, and any two of the at least two entities not belonging to a same entity.

The parsing module 420 is configured to parse the identifier information combination received by the first receiving module 410 to obtain the at least two identifiers included in the identifier information combination.

The display module 430 is configured to: obtain target objects having the identifiers obtained by the parsing module 420 by parsing, and display the obtained target objects in a combined manner on a display screen according to a pre-stored location relationship between target objects, the target objects having the identifiers being virtual images corresponding to entities having the identifier in a radio frequency identifier.

Figure 4B:
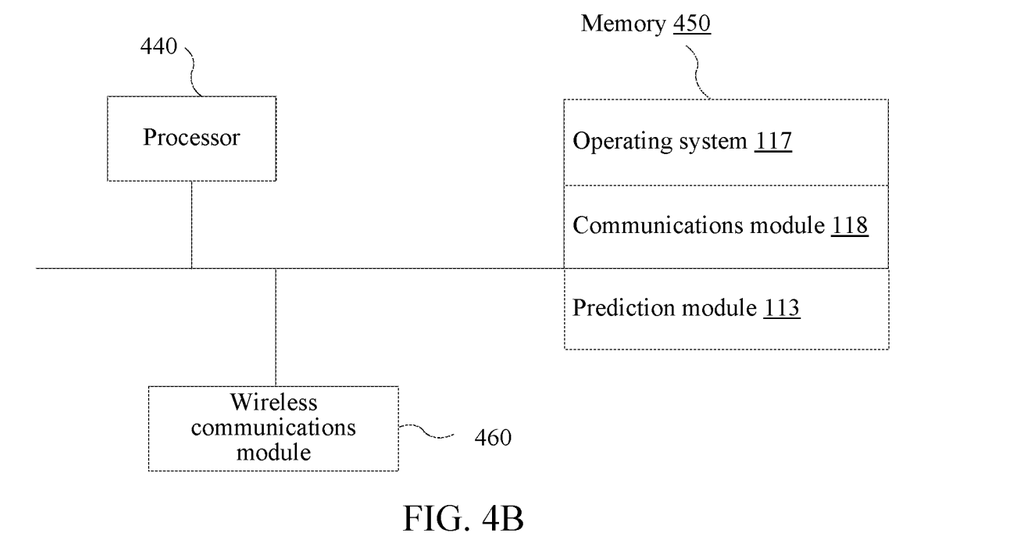
FIG. 4B is a schematic structural diagram of a target object display apparatus according to an embodiment of this application.

FIG. 4B is a block diagram of a target object display apparatus according to an embodiment of this application. As shown in FIG. 4B, the target object display apparatus may include: a processor 440, a memory 450, and a wireless communications module 460.

The processor 440 may include one or more processing units, and each processing unit may be a single-core or multi-core processor. The processor 440 may execute an instruction in the memory, to perform the method in the embodiments of this application.

The memory 450 may include instructions corresponding to the first receiving module 410, the parsing module 420, and the display module 430. The instructions may enable the processor 440 to perform functions of the first receiving module 410, the parsing module 420, and the display module 430.

The wireless communications module 470 is configured to receive an identifier information combination, and provide the received identifier information combination to the first receiving module 410.

In conclusion, in the target object display apparatus provided in this embodiment, the identifier information combination is received, the identifier information combination being generated by the communications device after identifying identifiers in radio frequency tags of at least two entities and combining the identified identifiers; the identifier information combination is parsed to obtain the at least two identifiers included in the identifier information combination; and the target objects having the identifiers are obtained, and the obtained target object are displayed in a combined manner on the display screen according to the pre-stored location relationship between target objects. The entity only needs to be placed in a sensing range of the communications device. The computing device may obtain the virtual target objects having the identifiers in the identifier information combination according to the identifiers in the identifier information combination sent by the communications device, and display the obtained target objects in a combined manner on the display screen according to the location relationship between target objects. Therefore, this achieves the technical effect of improving display efficiency, and resolves the technical problem in the related art that when a user views a target object in an application program, the user needs to perform complex operations, resulting in low display efficiency.

Figure 5:
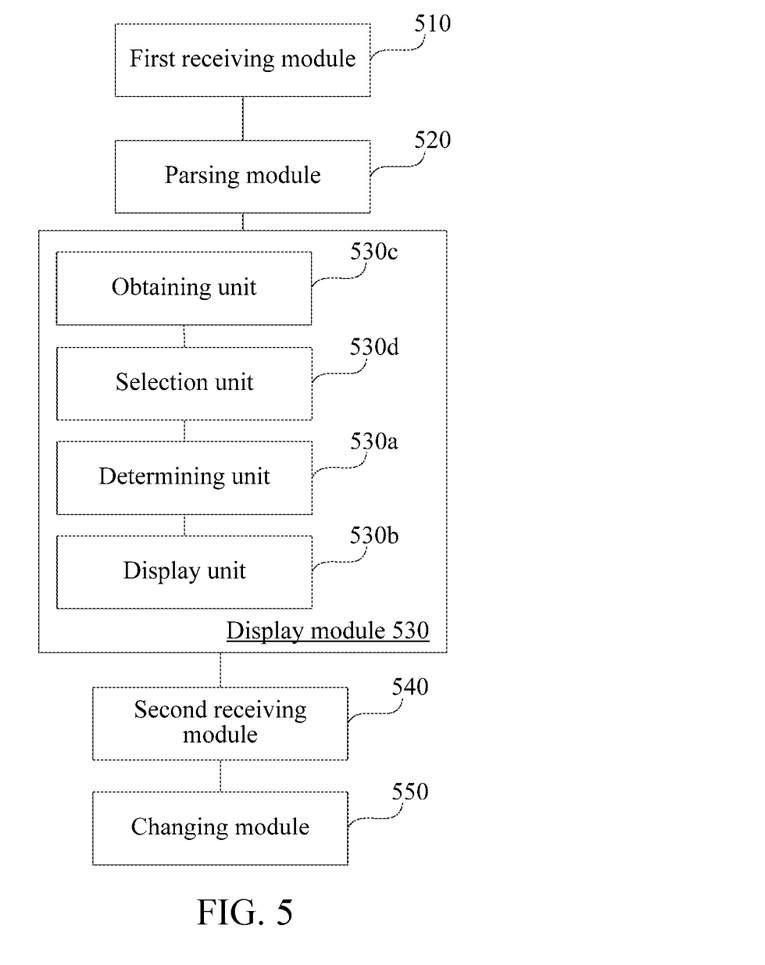
FIG. 5 is a schematic structural diagram of a target object display apparatus according to another embodiment of this application.

Referring to FIG. 5, FIG. 5 is a block diagram of a target object display apparatus according to another embodiment of this application. The target object display apparatus may include: a first receiving module 510, a parsing module 520, and a display module 530.

The first receiving module 510 is configured to receive an identifier information combination, the identifier information combination being generated by the communications device after identifying identifiers in radio frequency tags of at least two entities and combining the identified identifiers, and any two of the at least two entities not belonging to a same entity.

The parsing module 520 is configured to parse the identifier information combination received by the first receiving module 510 to obtain identifier information included in the identifier information combination.

The display module 530 is configured to: obtain target objects having the identifiers obtained by the parsing module 520 by parsing, and display the obtained target objects in a combined manner on a display screen according to a pre-stored location relationship between target objects, the target objects having the identifiers being virtual images corresponding to entities having the identifier in a radio frequency identifier.

Optionally, the display module 530 includes: a determining unit 530*a* and a display unit 530*b*.

The determining unit 530*a* is configured to determine the location relationship between the obtained target objects according to a pre-stored correspondence between a target object combination and a location relationship between target objects included in the target object combination.

The display unit 530*b* is configured to display the obtained target objects in a combined manner on the display screen according to the location relationship determined by the determining unit 530*a*.

Optionally, the target object display apparatus further includes:

a second receiving module 540, configured to receive a change instruction used to instruct a preset target object to change according to a specified change manner, where the change manner includes at least one of shape change, color change, and size change; and a changing module 550, configured to change the preset target object in the specified change manner.

Optionally, the display module 530 further includes: an obtaining unit 530*c* and a selection unit 530*d*.

The obtaining unit 530*c* is configured to obtain a type setting instruction including a specified type, where the specified type is a default type or a type specified by a user.

The selection unit 530*d* is configured to select target objects conforming to the instruction type from the target objects having the identifiers.

In conclusion, in the target object display apparatus provided in this embodiment, the identifier information combination is received, the identifier information combination being generated by the communications device after identifying identifiers in radio frequency tags of at least two entities and combining the identified identifiers; the identifier information combination is parsed to obtain the at least two identifiers included in the identifier information combination; and the target objects having the identifiers are obtained, and the obtained target object are displayed in a combined manner on the display screen according to the pre-stored location relationship between target objects. The entity only needs to be placed in a sensing range of the communications device. The computing device may obtain the virtual target objects having the identifiers in the identifier information combination according to the identifiers in the identifier information combination sent by the communications device, and display the obtained target objects in a combined manner on the display screen according to the location relationship between target objects. Therefore, this achieves the technical effect of improving display efficiency, and resolves the technical problem in the related art that when a user views a target object in an application program, the user needs to perform complex operations, resulting in low display efficiency.

Moreover, the computing device selects a target object conforming to the instruction type from the target objects having the identifier information by using the obtained type setting instruction. Therefore, during target object display, a target object of a display type specified by the user or a default display type may be displayed. In this way, a target object is not limited to one type, and display forms of the target objects are diversified.

The computing device may further change the preset target object according to the change manner specified by the change instruction. In this way, the user may edit the target object on the computing device according to requirements, and change a display effect of the target object, so that a display form of the target object is not limited to a form of entity.

An embodiment of this application further provides a target object display system. The target object display system includes: at least two entities including a radio frequency tag, a communications device connected to the entities in a radio frequency connection manner, and a computing device. The communications device and the computing device may perform the foregoing corresponding steps. Details are not described herein again.

When the target object display apparatus and system provided in the foregoing embodiments displays a target object, description is provided only by using examples of division of the functional modules. In an actual application, the functions may be assigned according to needs to be implemented by different functional modules, that is, the internal structure of the electronic device is divided into different functional modules, so as to implement all or a part of the functions described above. Besides, the target object display apparatus and system provided in the foregoing embodiment and embodiments of the target object display method belong to a same concept. Refer to the method embodiments for details of a specific implementation process thereof. Details are not described herein again.

The hardware modules in the embodiments may be implemented by using hardware or a hardware platform in combination with software. The software includes a machine readable instruction, stored in a non-volatile storage medium. Therefore, the embodiments may be represented as software products.

In the examples, hardware may be implemented by dedicated hardware or hardware executing a machine readable instruction. For example, hardware may be a specially designed permanent circuit or logical device (for example, a dedicated processor such as an FPGA or an ASIC) configured to perform a particular operation. Hardware may also include a programmable logical device or circuit (for example, including a general-purpose processor or another programmable processor) configured by software temporarily, and configured to perform a particular operation.

A machine readable instruction corresponding to the modules in the figures may enable an operating system operating on a computer and the like to perform some or all of the operations described herein. A non-volatile computer readable storage medium may be inserted into a memory disposed in an extension plate in a computer or written into a memory disposed in an extension unit connected to a computer. A CPU and the like installed on an extension plate or an extension unit may perform some or all actual operations according to an instruction.

A non-volatile the computer readable storage medium includes a floppy disk, a hard disk, a magneto-optical disk, an optical disc (such as a CD-ROM, a CD-R, a CD-RW, a DVD-ROM, a DVD-RAM, a DVD-RW, or a DVD+RW), a magnetic tape, a non-volatile memory card, and a ROM. Optionally, program code may be downloaded from a server computer by using a communication network.

In conclusion, the scope of claims shall not be limited by the implementations in the examples described above, and the specification shall be used as a whole and provided with the broadest interpretation.

What is claimed is:

1. A target object display method, applied to a computing device comprising one or more processors and memory storing a plurality of programs to be executed by the one or more processors, the method comprising:
    receiving an identifier information combination from a communications device, the identifier information combination being generated by the communications device after the communications device (1) receives and identifies respective identifiers in radio frequency tags of at least two entities located in a physical space associated with the communications device and (2) combines the identified identifiers to generate the identifier information combination;
    parsing the identifier information combination to obtain the respective identifiers of the at least two entities that are comprised in the identifier information combination;
    after parsing the identifier information combination, identifying at least two virtual target objects corresponding to the respective identifiers of the at least two entities that are parsed from the identifier information combination;
    in response to identifying the at least two virtual target objects, invoking an application associated with the at least two virtual target objects;
    determining a pre-stored location relationship between the at least two virtual target objects in accordance with a pre-stored correspondence between (1) a target object combination of virtual target objects and (2) a predetermined location relationship between the virtual target objects comprised in the target object combination; and
    displaying, using the application, the identified at least two virtual target objects in a combined manner on a display screen according to the pre-stored location relationship between the at least two virtual target objects, the at least two virtual target objects being virtual images corresponding to the at least two entities having the respective identifier in the radio frequency tags.

2. The method according to claim 1, wherein any two of the at least two entities do not belong to a same entity.

3. The method according to claim 1, wherein there is a first wireless communication connection between the computing device and the communications device and a respective second wireless communication connection between the communications device and each of the at least two entities.

4. The method according to claim 1, wherein the application is a computer game and each virtual target object is a virtual character of the computer game.

5. The method according to claim 1, wherein the method further comprises:
    receiving a change instruction used to instruct a preset target object to change according to a specified change manner, wherein the change manner comprises at least one of shape change, color change, and size change; and
    changing the preset target object in the specified change manner.

6. The method according to claim 1, further comprising:
obtaining a type setting instruction comprising specified types for displaying the at least two virtual target objects respectively, wherein the specified types are default types or types specified by a user for the at least two virtual target objects respectively; and
displaying the at least two virtual target objects conforming to the type setting instruction including the specified types corresponding to the at least two virtual target objects.

7. A computing device comprising a display screen, one or more processors, memory, and a plurality of programs stored in the memory that, when executed by the one or more processors, cause the electronic device to perform the following operations:
receiving an identifier information combination from a communications device, the identifier information combination being generated by the communications device after the communications device (1) receives and identifies respective identifiers in radio frequency tags of at least two entities located in a physical space associated with the communications device and (2) combines the identified identifiers to generate the identifier information combination;
parsing the identifier information combination to obtain the respective identifiers of the at least two entities that are comprised in the identifier information combination;
after parsing the identifier information combination, identifying at least two virtual target objects corresponding to the respective identifiers of the at least two entities that are parsed from the identifier information combination;
in response to identifying the at least two virtual target objects, invoking an application associated with the at least two virtual target objects;
determining a pre-stored location relationship between the at least two virtual target objects in accordance with a pre-stored correspondence between (1) a target object combination of virtual target objects and (2) a predetermined location relationship between the virtual target objects comprised in the target object combination; and
displaying, using the application, the identified at least two virtual target objects in a combined manner on a display screen according to the pre-stored location relationship between the at least two virtual target objects, the at least two virtual target objects being virtual images corresponding to the at least two entities having the respective identifier in the radio frequency tags.

8. The computing device according to claim 7, wherein any two of the at least two entities do not belong to a same entity.

9. The computing device according to claim 7, wherein there is a first wireless communication connection between the computing device and the communications device and a respective second wireless communication connection between the communications device and each of the at least two entities.

10. The computing device according to claim 7, wherein the application is a computer game and each virtual target object is a virtual character of the computer game.

11. The computing device according to claim 7, wherein the operations further comprise:
receiving a change instruction used to instruct a preset target object to change according to a specified change manner, wherein the change manner comprises at least one of shape change, color change, and size change; and
changing the preset target object in the specified change manner.

12. The computing device according to claim 7, wherein the operations further comprises:
obtaining a type setting instruction comprising specified type for displaying the at least two virtual target objects respectively, wherein the specified types are default types or types specified by a user for the at least two virtual target objects respectively; and
displaying the at least two virtual target objects conforming to the type setting instruction including the specified types corresponding to the at least two virtual target objects.

13. A non-transitory computer readable storage medium storing a plurality of programs that, when executed by an electronic device having a display screen, cause the electronic device to perform the following operations:
receiving an identifier information combination from a communications device, the identifier information combination being generated by the communications device after the communications device (1) receives and identifies respective identifiers in radio frequency tags of at least two entities located in a physical space associated with the communications device and (2) combines the identified identifiers to generate the identifier information combination;
parsing the identifier information combination to obtain the respective identifiers of the at least two entities that are comprised in the identifier information combination;
after parsing the identifier information combination, identifying at least two virtual target objects corresponding to the respective identifiers of the at least two entities that are parsed from the identifier information combination;
in response to identifying the at least two virtual target objects, invoking an application associated with the at least two virtual target objects;
determining a pre-stored location relationship between the at least two virtual target objects in accordance with a pre-stored correspondence between (1) a target object combination of virtual target objects and (2) a predetermined location relationship between the virtual target objects comprised in the target object combination; and
displaying, using the application, the identified at least two virtual target objects in a combined manner on a display screen according to the pre-stored location relationship between the at least two virtual target objects, the at least two virtual target objects being virtual images corresponding to the at least two entities having the respective identifier in the radio frequency tags.

14. The non-transitory computer readable storage medium according to claim 13, wherein any two of the at least two entities do not belong to a same entity.

15. The non-transitory computer readable storage medium according to claim 13, wherein there is a first wireless communication connection between the computing device and the communications device and a respective second wireless communication connection between the communications device and each of the at least two entities.

16. The non-transitory computer readable storage medium according to claim 13, wherein the application is a computer game and each virtual target object is a virtual character of the computer game.

17. The non-transitory computer readable storage medium according to claim 13, wherein the operations further comprise:
   receiving a change instruction used to instruct a preset target object to change according to a specified change manner, wherein the change manner comprises at least one of shape change, color change, and size change; and
   changing the preset target object in the specified change manner.

* * * * *